United States Patent
Miyaoka

(10) Patent No.: US 11,801,868 B2
(45) Date of Patent: Oct. 31, 2023

(54) HYBRID VEHICLE, CONTROL METHOD THEREFOR, AND STORAGE MEDIUM

(71) Applicant: Honda Motor Co., Ltd., Tokyo (JP)

(72) Inventor: Fumishige Miyaoka, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 198 days.

(21) Appl. No.: 17/218,184

(22) Filed: Mar. 31, 2021

(65) Prior Publication Data
US 2021/0300421 A1  Sep. 30, 2021

(30) Foreign Application Priority Data

Mar. 31, 2020 (JP) ................. 2020-063744

(51) Int. Cl.
*B60W 60/00* (2020.01)
*B60W 20/20* (2016.01)
*B60W 30/095* (2012.01)

(52) U.S. Cl.
CPC ........ *B60W 60/0015* (2020.02); *B60W 20/20* (2013.01); *B60W 30/095* (2013.01)

(58) Field of Classification Search
CPC ............ B60W 60/0015; B60W 20/20; B60W 30/095; B60W 10/06; B60W 10/08; B60W 20/19; B60W 30/143; B60W 2710/0644; B60W 2710/083; B60W 50/0097; B60W 30/18163; B60W 10/26; B60W 20/17;

(Continued)

(56) References Cited

U.S. PATENT DOCUMENTS 5,490,063 A   2/1996  Genise
5,653,302 A   8/1997  Edye et al.
(Continued)

FOREIGN PATENT DOCUMENTS

CN   1112063   11/1995
CN   1114742    1/1996
(Continued)

OTHER PUBLICATIONS

English Translation of WO-2019244261-A1 (Year: 2023).*
"Office Action of China Counterpart Application", dated May 19, 2023, with English translation thereof, pp. 1-25.

*Primary Examiner* — Rami Khatib
*Assistant Examiner* — Shahira Baajour
(74) *Attorney, Agent, or Firm* — JCIPRNET

(57) ABSTRACT

A hybrid vehicle, a control method therefor, and a storage medium which are capable of suppressing changes in an engine sound and vibration even when acceleration is performed at the time of increasing a required driving force are provided.

In a hybrid vehicle capable of performing automated driving control for automatically controlling at least acceleration and deceleration of a vehicle, a rotational speed of the engine is gradually increased by a predetermined increase step while maintaining or decelerating a vehicle speed of the hybrid vehicle until an increase timing of a required driving force in a case where it is predicted that the required driving force is required to be increased while the automated driving control is performed, and at least the power generated by the generator is supplied to the motor at the increase timing of the required driving force.

7 Claims, 6 Drawing Sheets

(58) Field of Classification Search
CPC ...... B60W 60/001; Y02T 10/62; Y02T 10/70; B60K 6/442; B60L 50/61
See application file for complete search history.

(56) References Cited

U.S. PATENT DOCUMENTS

| | | | | |
|---|---|---|---|---|
| 2012/0095630 A1* | 4/2012 | Muto | ................ | B60W 10/08 701/22 |
| 2019/0202458 A1* | 7/2019 | Konishi | .............. | B60W 30/162 |
| 2020/0391742 A1* | 12/2020 | Ariyoshi | ............... | B60W 10/06 |

FOREIGN PATENT DOCUMENTS

| | | |
|---|---|---|
| CN | 1653280 | 8/2005 |
| EP | 1510718 | 8/2014 |
| JP | 2019119303 | 7/2019 |
| WO | 2019116538 | 6/2019 |
| WO | 2019244261 | 12/2019 |

\* cited by examiner

HYBRID VEHICLE, CONTROL METHOD THEREFOR, AND STORAGE MEDIUM

CROSS-REFERENCE TO RELATED APPLICATION

This application claims the priority benefits of Japanese application no. 2020-063744, filed on Mar. 31, 2020. The entirety of the above-mentioned patent application is hereby incorporated by reference herein and made a part of this specification.

BACKGROUND

Technical Field

The present disclosure relates to a vehicle control technique in automated driving travel.

Description of Related Art

In automated driving vehicles, it is possible to previously calculate and execute an action to be executed next by recognizing a travel state and surrounding circumstances of a host vehicle. For example, in a case where an automated driving vehicle performs overtaking travel, it is necessary to perform determination regarding whether or not overtaking can be executed in accordance with surrounding circumstances, calculation of an acceleration in a case where overtaking is to be executed, and the like. For example, according to a travel control device disclosed in Patent Document 1 (Japanese Patent Laid-Open No. 2019-119303), in a case where an automated driving vehicle performs overtaking travel, appropriate travel control is performed by determining whether or not to execute overtaking in accordance with a travel state of a rear vehicle and previously calculating to what extent acceleration travel is required in a case where a rear vehicle has approached.

PATENT DOCUMENTS

In a hybrid electrical vehicle (HEV) (hereinafter, referred to as a hybrid vehicle), in a case where overtaking is executed during automated driving, the vehicle is accelerated by increasing a required driving force of an electromotor (hereinafter, referred to as a motor). The power required for acceleration at that time is obtained by increasing a rotational speed NE of an internal-combustion engine (hereinafter, referred to as an engine) to increase the amount of power generation. However, when an engine speed NE increases greatly due to an increase in a required driving force, an occupant feels a sense of discomfort if engine sound and vibration are suddenly increased, which leads to a deterioration in riding comfort.

The disclosure provides a vehicle control method and a vehicle control device which are capable of suppressing changes in an engine sound and vibration when a required driving force is increased.

SUMMARY

According to a first aspect of the disclosure, there is provided a hybrid vehicle capable of performing automated driving control for automatically controlling at least acceleration and deceleration of a vehicle, the hybrid vehicle including an engine, a generator which generates power by rotation of the engine, a motor which outputs a travel driving force by at least one of power generated by the generator and power stored in a battery, and a control device (100) which executes control of the engine and the motor together with the automated driving control, in which the control device (100) sequentially increases a rotational speed of the engine by a predetermined increase step while maintaining or decreasing a vehicle speed of the hybrid vehicle until an increase timing of a required driving force in a case where it is predicted that the required driving force is required to be increased while the automated driving control is performed, and supplies at least the power generated by the generator to the motor at the increase timing of the required driving force.

According to a second aspect of the disclosure, there is provided a control method of executing control of an engine and a motor together with automated driving control in a hybrid vehicle which is capable of performing automated driving control for automatically controlling at least acceleration and deceleration of a vehicle and includes an engine, a generator which generates power by rotation of the engine, a motor which outputs a travel driving force by at least one of power generated by the generator and power stored in a battery, and a control device which executes control of the engine and the motor together with the automated driving control, the control method including sequentially increasing a rotational speed of the engine by a predetermined increase step while maintaining or decelerating a vehicle speed of the hybrid vehicle until an increase timing of a required driving force in a case where it is predicted that the required driving force is required to be increased while the automated driving control is performed, and supplying at least the power generated by the generator to the motor at the increase timing of the required driving force.

According to a third aspect of the disclosure, there is provided a storage medium storing a program for a processor in a hybrid vehicle which is capable of performing automated driving control for automatically controlling at least acceleration and deceleration of a vehicle and includes an engine, a generator which generates power by rotation of the engine, a motor which outputs a travel driving force by at least one of power generated by the generator and power stored in a battery, and a processor which executes control of the engine and the motor together with the automated driving control, the program causing the processor to realize functions including a function of sequentially increasing a rotational speed of the engine by a predetermined increase step while maintaining or decelerating a vehicle speed of the hybrid vehicle until an increase timing of a required driving force in a case where it is predicted that the required driving force is required to be increased while the automated driving control is performed, and a function of supplying at least the power generated by the generator to the motor at the increase timing of the required driving force.

DESCRIPTION OF THE EMBODIMENTS

Thereby, an engine speed can be increased until the increase timing of the required driving force, and thus it is possible to avoid a sudden increase in the engine speed when the required driving force is increased, and to suppress great changes in an engine sound and vibration.

It is preferable that the predetermined increase step be a value smaller than a difference between a present engine speed and an engine speed when the required driving force is increased. Thereby, the engine speed is gradually increased until the increase timing of the required driving force, and thus an occupant hardly notices the increase.

It is preferable that the control device (100) sequentially decrease the rotational speed of the engine which has increased until then by a predetermined reduction step in a case where an increase in the required driving force is stopped, and the predetermined reduction step be smaller than the predetermined increase step. When an increase in the required driving force is stopped, the engine speed is gradually lowered, and the reduction step is smaller than the increase step, which allows an occupant to hardly notice the reduction.

It is preferable that the control device (100) wait regarding overtaking control until overtaking becomes possible in a case where the required driving force is required to be increased at the time of overtaking and there is a possibility that the hybrid vehicle will collide with a front or rear vehicle on an overtaking lane when the overtaking is executed. Thereby, the engine speed can be increased until an overtaking control starting timing, and thus it is possible to avoid a sudden change in the engine speed when overtaking control is started and to suppress great changes in an engine sound and vibration.

As described above, according to the disclosure, it is possible to suppress changes in an engine sound and vibration when a required driving force is increased.

1. Outline of Embodiment

In a hybrid vehicle capable of supplying power generated by the rotation of an engine to a motor for driving a vehicle, in a case where there is time until a required driving force of the motor is required during automated driving, an engine speed is gradually increased until an increase timing of the required driving force. Thereby, when a driving force is actually increased, the amount of increase up to an engine speed required for the required driving force can be reduced. A sudden increase in the engine speed is alleviated in this manner, and thus great changes in engine sound and vibration can be suppressed.

Hereinafter, an example of automated driving control and a hybrid vehicle which are the premise of the disclosure will be described with reference to FIGS. 1 and 2, and subsequently, an embodiment of the disclosure will be described in detail.

2. Automated Driving Control

Figure 1:
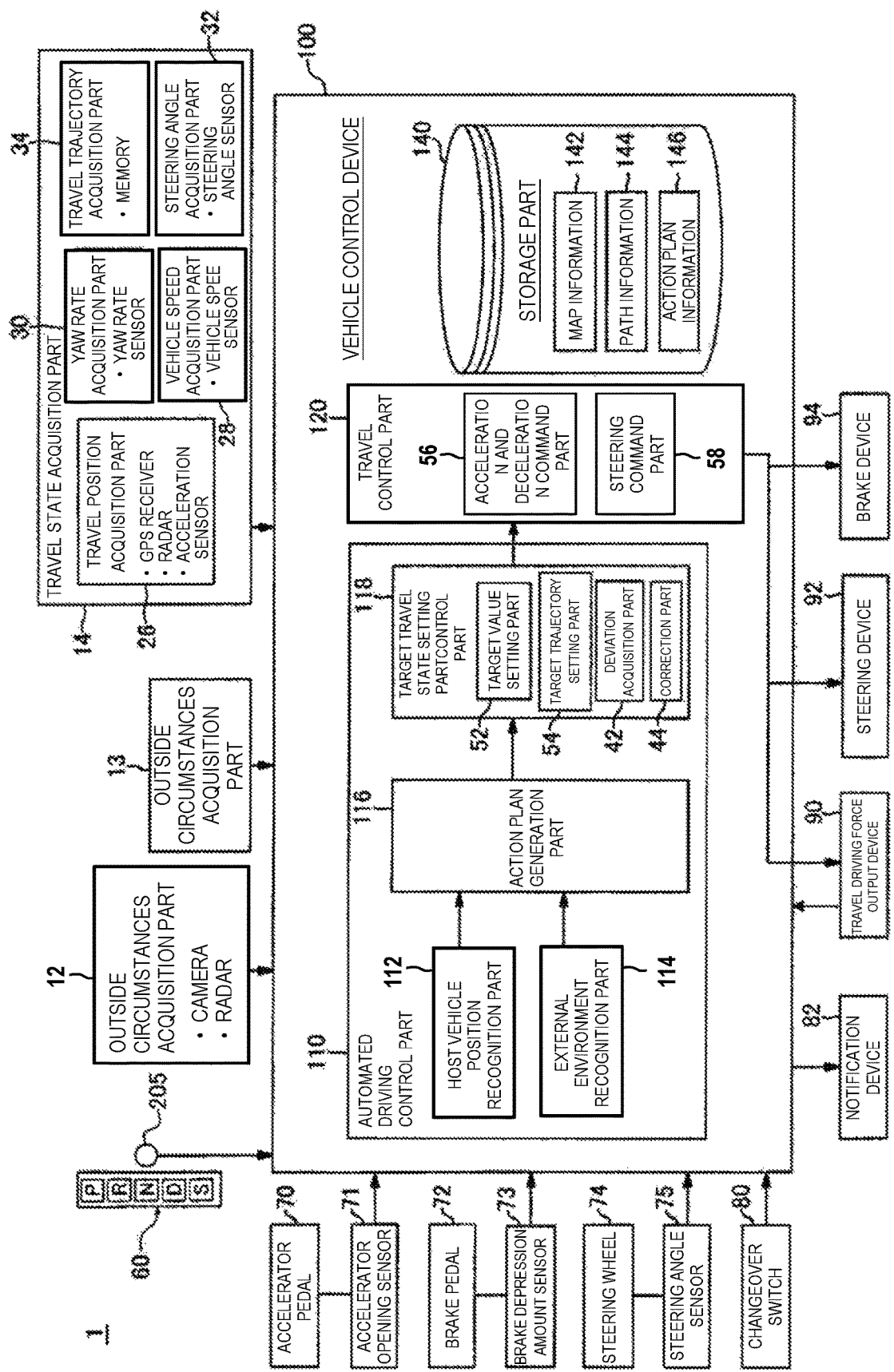
FIG. 1 is a functional configuration diagram related to automated driving control in a control device of a vehicle according to an embodiment of the disclosure.

As illustrated in FIG. 1, a vehicle 1 is an automobile having two wheels, three wheels, four wheels, or the like, and is a hybrid vehicle having both an engine (internal-combustion engine) and a motor (electromotor) as will be described later in the present embodiment. However, automated driving control may be applied to an automobile driven using a diesel engine, a gasoline engine, or the like as a driving source, or may be applied to an electric vehicle that drives a motor using power obtained from a secondary battery, a hydrogen fuel cell, a metal fuel cell, an alcohol fuel cell, or the like.

<Device Configuration of Vehicle>

The vehicle 1 is equipped with the following devices and equipment group in addition to a vehicle control device 100 that performs vehicle control including automated driving control.

- Parts for taking various information in from the outside of the vehicle 1 (an outside circumstances acquisition part 12, a path information acquisition part 13, a travel state acquisition part 14, and the like are included, and other buttons, a dial switch, a graphical user interface (GUI) switch, and the like may be included)
- Operation devices (an accelerator pedal 70, a brake pedal 72, a steering wheel 74, a changeover switch 80, and the like)
- Operation detection sensors (an accelerator opening sensor 71 that detects an accelerator opening of the accelerator pedal 70, a brake depression amount sensor (brake switch) 73 that detects a depression amount of the brake pedal 72, and a steering angle sensor (or a steering torque sensor) 75 that detects a steering angle of the steering wheel 74)
- A notification device (output unit) 82
- A device for performing driving or steering of the vehicle 1 (a travel driving force output device (driving device) 90, a steering device 92, a brake device 94), and
- A communication line and a network connecting these devices and equipment (controller area network (CAN), wireless communication network, and the like).

The outside circumstances acquisition part 12 is configured to acquire the outside circumstances of the vehicle 1, for example, environmental information around the vehicle such as lanes of a traveling path and objects around the vehicle, and includes, for example, various cameras (a monocular camera, a stereo camera, an infrared camera, and the like), various radars (a millimeter wave radar, a microwave radar, a laser radar, and the like), and the like. In addition, it is also possible to use a fusion sensor that combines information obtained by the cameras and information obtained by the radars.

The path information acquisition part 13 includes a navigation device. The navigation device includes a global navigation satellite system (GNSS) receiver, map information (navigation map), a touch panel type display device functioning as a user interface, a speaker, a microphone, and the like. The navigation device specifies the position of the vehicle 1 by the GNSS receiver and derives a path from the position to a destination designated by a user. The path derived by the navigation device is stored in a storage part 140 as path information 144. The position of the vehicle 1 may be specified or complemented by an inertial navigation system (INS) using an output of the travel state acquisition part 14. In addition, the navigation device performs guidance for a route to a destination through sound or navigation display in a case where the vehicle control device 100 executes manual driving control. Meanwhile, a configuration for specifying the position of the vehicle 1 may be provided independently of the navigation device. In addition, the navigation device may be realized by one function of a terminal device carried by a user such as a smartphone or a tablet terminal. In this case, information is transmitted and received between the terminal device and the vehicle control device 100 through wireless or wired communication.

The travel state acquisition part 14 is configured to acquire the present travel state of the vehicle 1. The travel state acquisition part 14 includes a travel position acquisition part 26, a vehicle speed acquisition part 28, a yaw rate acquisition part 30, a steering angle acquisition part 32, and a travel trajectory acquisition part 34.

The travel position acquisition part 26 is configured to acquire the travel position of the vehicle 1 which is one of travel states, and the posture of the vehicle 1 (moving direction). The travel position acquisition part 26 includes various positioning devices, for example, a device (a GPS receiver, a GNSS receiver, a beacon receiver, or the like) which receives electromagnetic waves transmitted from satellites and on-road devices to acquire positional information (latitude, longitude, altitude, coordinates, and the like), a gyro sensor, an acceleration sensor, and the like. The travel position of the vehicle 1 is measured on the basis of a specific area of the vehicle 1.

The vehicle speed acquisition part 28 is configured to acquire the speed of the vehicle 1 (hereinafter, referred to as a vehicle speed) which is one of travel states. The vehicle speed acquisition part 28 includes, for example, a speed sensor provided in one or more wheels, and the like.

The yaw rate acquisition part 30 is configured to acquire a yaw rate of the vehicle 1 which is one of travel states. The yaw rate acquisition part 30 includes, for example, a yaw rate sensor and the like.

The steering angle acquisition part 32 is configured to acquire a steering angle which is one of travel states. The steering angle acquisition part 32 includes, for example, a steering angle sensor provided in a steering shaft, and the like. Here, a steering angle speed and a steering angle acceleration are also acquired on the basis of the acquired steering angle.

The travel trajectory acquisition part 34 is configured to acquire information (actual travel trajectory) of an actual travel trajectory of the vehicle 1 which is one of travel states. The actual travel trajectory includes a trajectory (track) on which the vehicle 1 has actually traveled, and may include a track on which the vehicle is scheduled to travel, for example, an extension line on the side in front of a travel trajectory (track) in a moving direction. The travel trajectory acquisition part 34 includes a memory. The memory stores positional information of a series of point sequences included in the actual travel trajectory. In addition, the extension line can be predicted by a computer or the like.

The accelerator opening sensor 71, the brake depression amount sensor 73, and the steering angle sensor 75 which are operation detection sensors respectively output an accelerator opening, a brake depression amount, and a steering angle to the vehicle control device 100 as detection results.

The changeover switch 80 is a switch operated by an occupant of the vehicle 1. The changeover switch 80 can receive an operation of the occupant and switch a driving mode (for example, automated driving control and manual driving control) from details of the received operation. The changeover switch 80 generates a driving mode designation signal for designating a driving mode of the vehicle 1 from the details of the occupant's operation and outputs the generated driving mode designation signal to the vehicle control device 100.

In addition, the vehicle 1 includes a shift device 60 which is operated by a driver through a shift lever. Positions of the shift lever (not shown) in the shift device 60 include, for example, P (parking), R (backward travel), N (neutral), D (forward travel in an automatic shift mode (normal mode)), S (forward travel in a sport mode), and the like as illustrated in FIG. 1. A shift position sensor 205 is provided in the vicinity of the shift device 60. The shift position sensor 205 detects the position of the shift lever which is operated by a driver. The vehicle control device 100 inputs information of a shift position detected by the shift position sensor 205.

The notification device 82 is a device or an equipment group which is capable of outputting various information. The notification device 82 outputs, for example, information for prompting an occupant of the vehicle 1 to transition from automated driving control to manual driving control. As the notification device 82, at least one of, for example, a speaker, a vibrator, a display device, a light emitting device, and the like is used.

Figure 2:
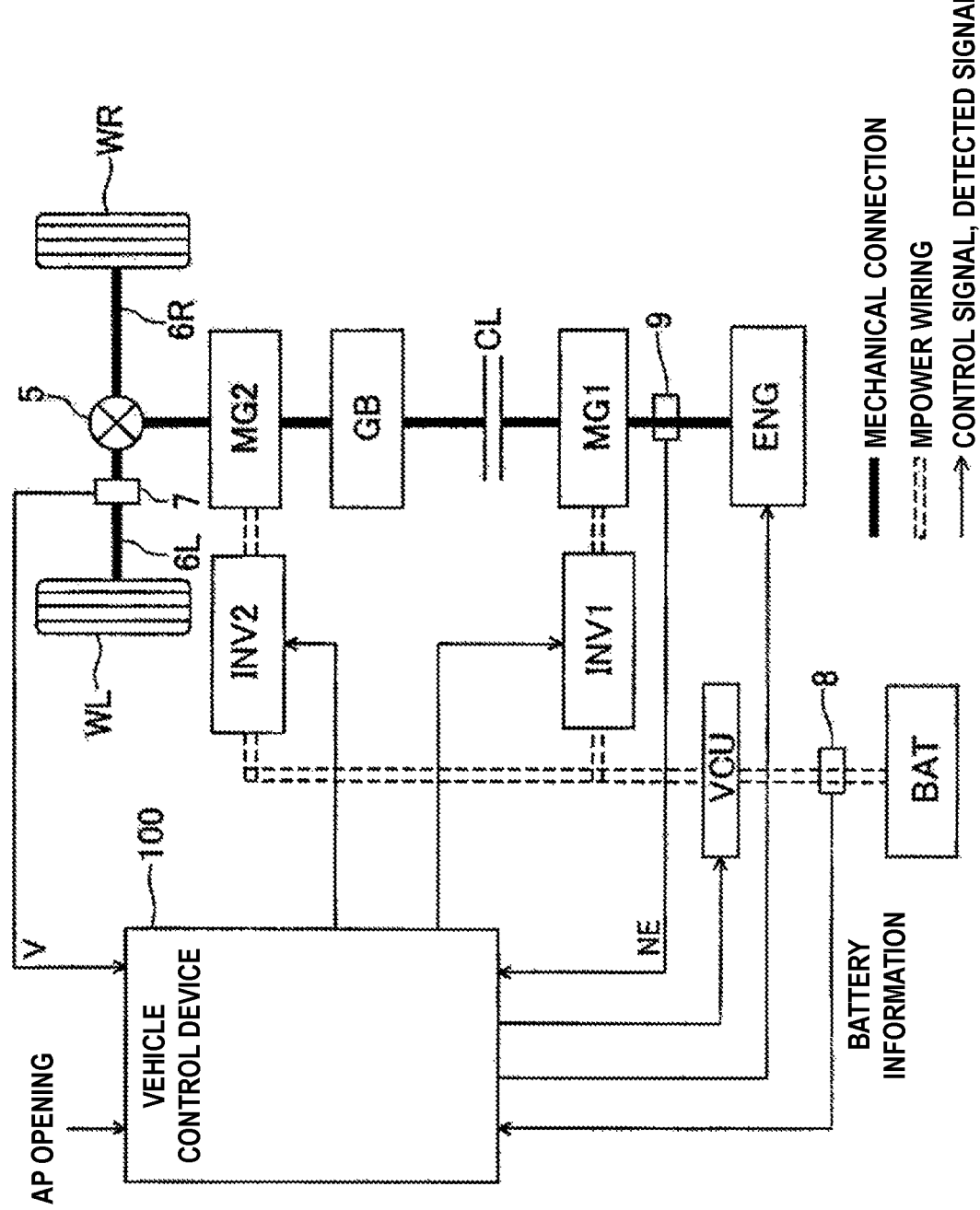
FIG. 2 is a block diagram schematically illustrating an example of an internal configuration of a hybrid vehicle using a control device according to the embodiment of the disclosure.

The travel driving force output device (driving device) 90 includes an engine ENG as a driving source and first and second motor generators MG1 and MG2 as illustrated in FIG. 2 in the hybrid vehicle 1 in the present embodiment. Meanwhile, in addition to these, the travel driving force output device 90 may include a travel motor and a motor ECU controlling the travel motor in a case where the vehicle 1 is an electric car using an electromotor (motor) as a driving source. Further, in a case where the travel driving force output device 90 is constituted by an engine and an automatic transmission, the travel driving force output device 90 may include the engine, an electronic control unit (FI-ECU) controlling the engine, the automatic transmission, and an AT-ECU controlling the automatic transmission.

The steering device 92 includes, for example, an electric motor. The electric motor applies a force to, for example, a rack and pinion mechanism to change the direction of a steering wheel. The steering device 92 drives the electric motor in accordance with information input from the travel control part 120 to change the direction of the steering wheel.

The brake device 94 is an electric servo brake device including, for example, a brake caliper, a cylinder that transmits hydraulic pressure to the brake caliper, an electric motor that generates hydraulic pressure in the cylinder, and a braking control part. The braking control part of the electric servo brake device controls the electric motor in accordance with information which is input from the travel control part 120 and causes a brake torque (braking force output device) for outputting a braking force based on a braking operation to be output to wheels. The electric servo brake device may include a mechanism that transmits hydraulic pressure generated by the operation of the brake pedal 72 to the cylinder through a master cylinder as a backup. Meanwhile, the brake device 94 is not limited to the above-described electric servo brake device, and may be an electronically controlled hydraulic pressure brake device. The electronically controlled hydraulic pressure brake device controls an actuator in accordance with information input from the travel control part 120 to transmit hydraulic pressure of the master cylinder to the cylinder. Further, in a case where the travel driving force output device 90 includes a travel motor, the brake device 94 may include a regenerative brake based on the travel motor.

<Control Device>

Next, the vehicle control device 100 will be described. The vehicle control device 100 includes an automated driving control part 110, a travel control part 120, and a storage part 140. The automated driving control part 110 includes a host vehicle position recognition part 112, an external environment recognition part 114, an action plan generation part 116, and a target travel state setting part 118. Some or all of the parts of the automated driving control part 110 and the travel control part 120 may be realized by a processor such as a central processing unit (CPU) executing programs. In addition, some or all of these parts may be realized by hardware such as a large scale integration (LSI) or an application specific integrated circuit (ASIC). In addition, the storage part 140 may be realized by a read only memory (ROM), a random access memory (RAM), a hard disk drive (HDD), a flash memory, or the like. The programs executed by the processor may be stored in the storage part 140 in advance or may be downloaded from an external device through an on-vehicle Internet facility or the like. In addition, the programs may be installed in the storage part 140 by a portable storage medium storing the programs being mounted on a drive device not illustrated in the drawing. In addition, the vehicle control device 100 may be dispersed over a plurality of computer devices. Thereby, it is also possible to realize various processes in the present embodiment by making the above-described hardware functional parts and software constituted by a program cooperate with each other with respect to the on-vehicle computer of the vehicle 1.

The automated driving control part 110 can switch driving modes in response to an input of a signal from the change-over switch 80. The driving modes include an automated driving mode (automated driving control) for automatically controlling acceleration, deceleration, and steering of the vehicle 1, and a manual driving mode (manual driving control) for controlling acceleration and deceleration of the vehicle 1 on the basis of an operation for an operation device such as the accelerator pedal 70 or the brake pedal 72 and controlling steering on the basis of an operation for an operation device such as the steering wheel 74, but this is not limiting. Other driving modes may include, for example, a semi-automated driving mode (semi-automated driving control) for automatically controlling one of acceleration, deceleration, and steering of the vehicle 1 and controlling the others on the basis of an operation for an operation device.

The host vehicle position recognition part 112 of the automated driving control part 110 recognizes a lane (travel lane) on which the vehicle 1 is traveling and a relative position of the vehicle 1 to the travel lane on the basis of map information 142 stored in the storage part 140 and information input from the outside circumstances acquisition part 12, the path information acquisition part 13, or the travel state acquisition part 14. The map information 142 is, for example, map information having higher accuracy than that of a navigation map included in the path information acquisition part 13, and includes information on the center of a lane, information on a boundary of a lane, and the like. More specifically, the map information 142 includes road information, traffic regulation information, address information (address/zip code), facility information, telephone number information, and the like. The road information includes information indicating the type of road such as highways, toll roads, national roads, and prefectural roads, and information such as the number of lanes of roads, the width of each lane, slopes of roads, and the positions of roads (3D coordinates including longitude, latitude, and height), curvatures of lane curves, positions of joining and branch points of lanes, and signs provided on roads. The traffic regulation information includes information indicating that lanes are blocked due to construction work, traffic accidents, traffic jams, and the like.

The host vehicle position recognition part 112 recognizes, for example, a deviation of a reference point (for example, the center of gravity) of the vehicle 1 from the center of the travel lane, and an angle formed with respect to a line connecting the centers of the travel lane of the vehicle 1 in a moving direction as a relative position of the vehicle 1 with respect to the travel lane. Meanwhile, alternatively, the host vehicle position recognition part 112 may recognize the position of the reference point of the vehicle 1 with respect to any one side end part of a host vehicle lane, and the like as a relative position of the vehicle 1 with respect to the travel lane.

The external environment recognition part 114 recognizes states such as the positions, speeds, and accelerations of the surrounding vehicles on the basis of information input from the outside circumstances acquisition part 12 and the like. The surrounding vehicles in the present embodiment are other vehicles that travel around the vehicle 1, and are vehicles that travel in the same direction as the vehicle 1. Meanwhile, particularly, the surrounding vehicles in the present embodiment include a front vehicle that the vehicle 1 attempts to overtake and a rear vehicle that attempts to overtake the vehicle 1. The position of the surrounding vehicle may be represented by a representative point such as the center of gravity or a corner of the vehicle 1, or may be represented by a region expressed by the contour of the vehicle 1. The "state" of the surrounding vehicle may include whether or not the acceleration or the lane of the surrounding vehicle has been changed (or whether or not there is an attempt to change the lane) on the basis of information on the above-described various equipment. In addition, the external environment recognition part 114 may recognize positions of guardrails, electric poles, parked vehicles, pedestrians, and other objects in addition to the surrounding vehicles.

The action plan generation part 116 sets a starting point of automated driving, a scheduled end point of automated driving, and/or a destination of automated driving. The starting point of the automated driving may be the present position of the vehicle 1 or may be a point at which an occupant of the vehicle 1 performs an operation for instructing automated driving. The action plan generation part 116 generates an action plan in a section between the starting point and the scheduled end point and a section between the starting point and the destination of the automated driving. Meanwhile, this is not limiting, and the action plan generation part 116 may generate an action plan for any section.

The action plan is constituted by, for example, a plurality of events that are sequentially executed. The events include, for example, a deceleration event for decelerating the vehicle 1, an acceleration event for accelerating the vehicle 1, a lane keeping event for causing the vehicle 1 to travel so as not to deviate from a travel lane, a lane change event for changing a travel lane, an overtaking event for causing the vehicle 1 to overtake a preceding vehicle, a branch event for changing the vehicle 1 to a desired lane at a branch point or causing the vehicle 1 to travel so as not to deviate from the present travel lane, a joining event for accelerating and decelerating the vehicle 1 on a joining lane for joining in a main lane to change a travel lane, and the like. For example, in a case where there is a junction (crossroads) on a toll road (for example, a highway or the like), the vehicle control device 100 changes a lane or maintains a lane so that the vehicle 1 moves in the direction of a destination. Thus, in a case where the action plan generation part 116 determines that there is a junction on a path with reference to the map information 142, the action plan generation part sets a lane change event for changing a lane to a desired lane between the present position (coordinates) of the vehicle 1 and the position (coordinates) of the junction so that the vehicle 1 can move in the direction of the destination. Meanwhile, information indicating an action plane generated by the action plan generation part 116 is stored in the storage part 140 as the action plan information 146.

The target travel state setting part 118 is configured to set a target travel state which is a target travel state of the vehicle 1 on the basis of an action plan determined by the action plan generation part 116 and various information acquired by the outside circumstances acquisition part 12, the path information acquisition part 13, and the travel state acquisition part 14. The target travel state setting part 118 includes a target value setting part 52 and a target trajectory setting part 54. In addition, the target travel state setting part 118 also includes a deviation acquisition part 42 and a correction part 44.

The target value setting part 52 is configured to set information of a target travel position (latitude, longitude, altitude, coordinates, and the like) of the vehicle 1 (also referred to simply as a target vehicle speed), target value information of a vehicle speed (also referred to simply as a target vehicle speed), and a target value information of a yaw rate (also referred to simply as a target yaw rate). The target trajectory setting part 54 is configured to set information of a target trajectory of the vehicle 1 (also referred to simply as a target trajectory) on the basis of the outside circumstances acquired by the outside circumstances acquisition part 12 and travel path information acquired by the path information acquisition part 13. The target trajectory includes information on a target position for each unit time. Posture information (moving direction) of the vehicle 1 is associated with each target position. In addition, target value information such as a vehicle speed, an acceleration, a yaw rate, a lateral G, a steering angle, a steering angle speed, and a steering angle acceleration may be associated with each target position. The above-described target position, target vehicle speed, target yaw rate, and target trajectory are information indicating a target travel state.

The deviation acquisition part 42 is configured to acquire a deviation of an actual travel state with respect to a target travel state on the basis of the target travel state set by the target travel state setting part 118 and the actual travel state acquired by the travel state acquisition part 14.

The correction part 44 is configured to correct the target travel state in accordance with the deviation acquired by the deviation acquisition part 42. Specifically, a new target travel state is set by bringing the target travel state set by the target travel state setting part 118 closer to the actual travel state acquired by the travel state acquisition part 14 as the deviation becomes larger.

The travel control part 120 is configured to control the travel of the vehicle 1. Specifically, a command value for travel control is output so as to make the travel state of the vehicle 1 consistent with or approach the target travel state set by the target travel state setting part 118 or the new target travel state set by the correction part 44. The travel control part 120 includes an acceleration and deceleration command part 56 and a steering command part 58.

The acceleration and deceleration command part 56 is configured to perform acceleration and deceleration control among the travel controls of the vehicle 1. Specifically, the acceleration and deceleration command part 56 arithmetically operates an acceleration and deceleration command value for making the travel state of the vehicle 1 consistent with a target travel state on the basis of a target travel state (target acceleration and deceleration) set by the target travel state setting part 118 or the correction part 44 and the actual travel state (actual acceleration and deceleration).

The steering command part 58 is configured to perform steering control among the travel controls of the vehicle 1. Specifically, the steering command part 58 arithmetically operates a steering angle speed command value for making the travel state of the vehicle 1 consistent with a target travel state on the basis of the target travel state set by the target travel state setting part 118 or the correction part 44 and the actual travel state.

<Driving System and Power Supply System of Hybrid Vehicle>

In FIG. 2, a configuration of the travel driving force output device (driving device) 90 of the vehicle 1 is schematically illustrated. In general, a hybrid vehicle includes a motor generator and an engine and travels by power of the motor generator and/or the engine in accordance with the travel state of the vehicle. An HEV is roughly classified into two types, that is, a series system and a parallel system. An HEV of a series system travels by power of a motor generator. An engine is mainly used to generate power, and power generated by another motor generator by the power of the engine is charged in a battery or supplied to the motor generator. On the other hand, an HEV of a parallel system travels by power of any one or both of a motor generator and an engine.

In addition, the vehicle 1 of the present embodiment is an HEV capable of switching the above-described series system and parallel system. That is, the travel driving force output device (driving device) 90 of the vehicle 1 can switch a power transmission system to either a series system or a parallel system by releasing or engaging (disengaging) a clutch according to a travel state.

The travel driving force output device 90 illustrated in FIG. 2 includes an engine ENG which is a motor (driving source) that outputs rotating power, a first motor generator MG1, a second motor generator MG2, a lock-up clutch (hereinafter, referred to simply as a "clutch") CL, a gear box (hereinafter, referred to simply as a "gear") GB, a vehicle speed sensor 7, a battery sensor 8, an engine speed (NE) sensor 9, a battery (power storage device) BAT, a voltage control unit VCU, a first inverter INV1, and a second inverter INV2. Meanwhile, a thick solid line in FIG. 2 indicates mechanical connection, a double dashed line indicates power wiring, and an arrow of a thin solid line indicates a control signal or a detected signal.

The engine ENG is driven using the first motor generator MG1 as a power generator in a state where the clutch CL is disconnected. However, when the clutch CL is disconnected, power output by the engine ENG is transmitted to drive wheels WL and WR through the first motor generator MG1, the clutch CL, the gear GB, the second motor generator MG2, a differential mechanism 5, and drive shafts 6R and 6L as mechanical energy for traveling the vehicle 1.

The first motor generator MG1 is driven by power of the engine ENG to generate power. In addition, the first motor generator MG1 may operate as an electromotor when the vehicle 1 is braked.

The second motor generator MG2 operates as an electromotor by power supplied from at least one of the battery BAT and the first motor generator MG1 to generate power for traveling the vehicle 1. A torque generated by the second motor generator MG2 is transmitted to the drive wheels WL and WR through the differential mechanism 5 and the drive shafts 6R and 6L. In addition, the second motor generator MG2 may operate as a power generator when the vehicle 1 is braked.

The clutch CL disconnects or engages (disengages) a transmission path of power from the engine ENG to the drive wheels WL and WR in response to an instruction given from the vehicle control device 100. Power output by the engine ENG is not transmitted to the drive wheels WR and WL when the clutch CL is in a disconnected state, and power output by the engine ENG is transmitted to the drive wheels WR and WL when the clutch CL is in a connected state. The gear GB, including a shift stage or a fixed stage, shifts power transmitted from the engine ENG at a predetermined shift ratio and transmits the power to the drive wheels WL and WR. A shift ratio in the gear GB is changed in response to an instruction received from the vehicle control device 100.

The battery BAT includes a plurality of storage cells connected in series and supplies a high voltage of, for example, 100 V to 200 V. The storage cell is, for example, a lithium ion battery or a nickel-hydrogen battery.

The vehicle speed sensor 7 detects a travel speed (vehicle speed V) of the vehicle 1. Meanwhile, the vehicle speed V corresponds to rotational speeds and alinement of the drive wheels WL and WR. A signal indicating the vehicle speed V detected by the vehicle speed sensor 7 is transmitted to the vehicle control device 100.

The battery sensor 8 detects outputs (a terminal voltage, a charging/discharging current) of the battery BAT. Signals indicating the terminal voltage, the charging/discharging current, and the like detected by the battery sensor 8 are transmitted to the vehicle control device 100 as battery information (for example, a ratio of a remaining capacity SOC (state of charge)).

The rotational speed sensor 9 detects a rotational speed NE of the engine ENG. A signal indicating the rotational speed NE detected by the rotational speed sensor 9 is transmitted to the vehicle control device 100.

The battery control unit VCU steps up an output voltage of the battery BAT when the second motor generator MG2 operates as an electromotor. In addition, the battery control unit VCU steps down an output voltage of the second motor generator MG2 when the battery control unit VCU charges regenerative power generated by the second motor generator MG2 and converted into direct current at the time of braking the vehicle 1 in the battery BAT. Further, the battery control unit VCU steps down the voltage of power generated by the first motor generator MG1 and converted into direct current due to the driving of the engine ENG. The power stepped down by the battery control unit VCU is charged in the battery BAT.

The vehicle control device 100 performs driving control of the engine ENG, output control of the first motor generator MG1 based on the control of the first inverter INV1, disengagement control of the clutch CL, and output control of the second motor generator MG2 based on the control of the second inverter INV2. In addition, the vehicle control device 100 inputs signals indicating an AP opening, an engine speed NE received from the rotational speed sensor 9, and a vehicle speed V received from the vehicle speed sensor 7, and controls outputs of the engine ENG, the first motor generator MG1, and the second motor generator MG2 on the basis of the present acceleration received from the travel position acquisition part 26, the states of the surrounding vehicles, an acceleration command, and an action plan.

The travel driving force output device 90 of the vehicle 1 of the present embodiment causes the vehicle 1 to travel in any one driving mode of an "EV travel mode (electromotor travel mode)", a "series travel mode", and an "engine travel mode (parallel travel mode)" which have different usage modes of a driving source including the engine ENG, the first motor generator MG1, and the second motor generator MG2.

When the vehicle 1 travels in an EV travel mode, the vehicle travels by power received from the first motor generator MG1 and/or the second motor generator MG2. When the vehicle 1 travels in a series travel mode, the clutch CL is released, and the vehicle travels by power received from the first motor generator MG1. In the series travel mode, power generated by the first motor generator MG1 is supplied to the second motor generator MG2 through the operation of the engine ENG so that the second motor generator MG2 outputs power corresponding to a required output based on a vehicle speed V and an AP opening, as will be described later. Meanwhile, the series travel mode is selected when the required output of the vehicle 1 is a predetermined value or more or the vehicle speed V is a predetermined value or more. When the vehicle 1 travels in the engine travel mode, the clutch CL is engaged, and the vehicle travels by power received from the engine ENG.

<Automated Driving Control>

In the vehicle 1, when automated driving control is selected, the automated driving control part 110 performs automated driving control of the vehicle 1. In the automated driving control, the automated driving control part 110 ascertains the present travel state (an actual travel trajectory, a travel position, or the like) of the vehicle 1 on the basis of information acquired from the outside circumstances acquisition part 12, the path information acquisition part 13, the travel state acquisition part 14, and the like or information recognized by the host vehicle position recognition part 112 and the external environment recognition part 114. The target travel state setting part 118 sets a target travel state (a target trajectory or a target position) which is a target travel state of the vehicle 1 on the basis of an action plan generated by the action plan generation part 116. The deviation acquisition part 42 acquires a deviation of the actual travel state with respect to the target travel state. The travel control part 120 performs travel control so as to make the travel state of the vehicle 1 consistent with or approach the target travel state in a case where a deviation has been acquired by the deviation acquisition part 42.

The correction part 44 corrects a target trajectory or a target position on the basis of the travel position acquired by the travel position acquisition part 26. The travel control part 120 performs acceleration and deceleration control of the vehicle 1 by the travel driving force output device 90 and the brake device 94 on the basis of a vehicle speed acquired by the vehicle speed acquisition part, and the like so that the vehicle 1 follows a new target trajectory or target position.

In addition, the correction part 44 corrects a target trajectory on the basis of a travel position acquired by the travel position acquisition part 26. The travel control part 120 performs steering control by the steering device 92 on the basis of a steering angle speed acquired by the steering angle acquisition part 32 so that the vehicle 1 follows a new target trajectory.

3. Embodiment

Hereinafter, a control method according to an embodiment of the disclosure will be described in detail. The control method according to the present embodiment can be installed in the above-described system. Here, acceleration and driving force control at the time of an overtaking event will be described, but the disclosure can be applied not only to the case of overtaking but also a situation in which a sudden increase in a driving force is expected.

3.1) Overtaking Control

Figure 3:
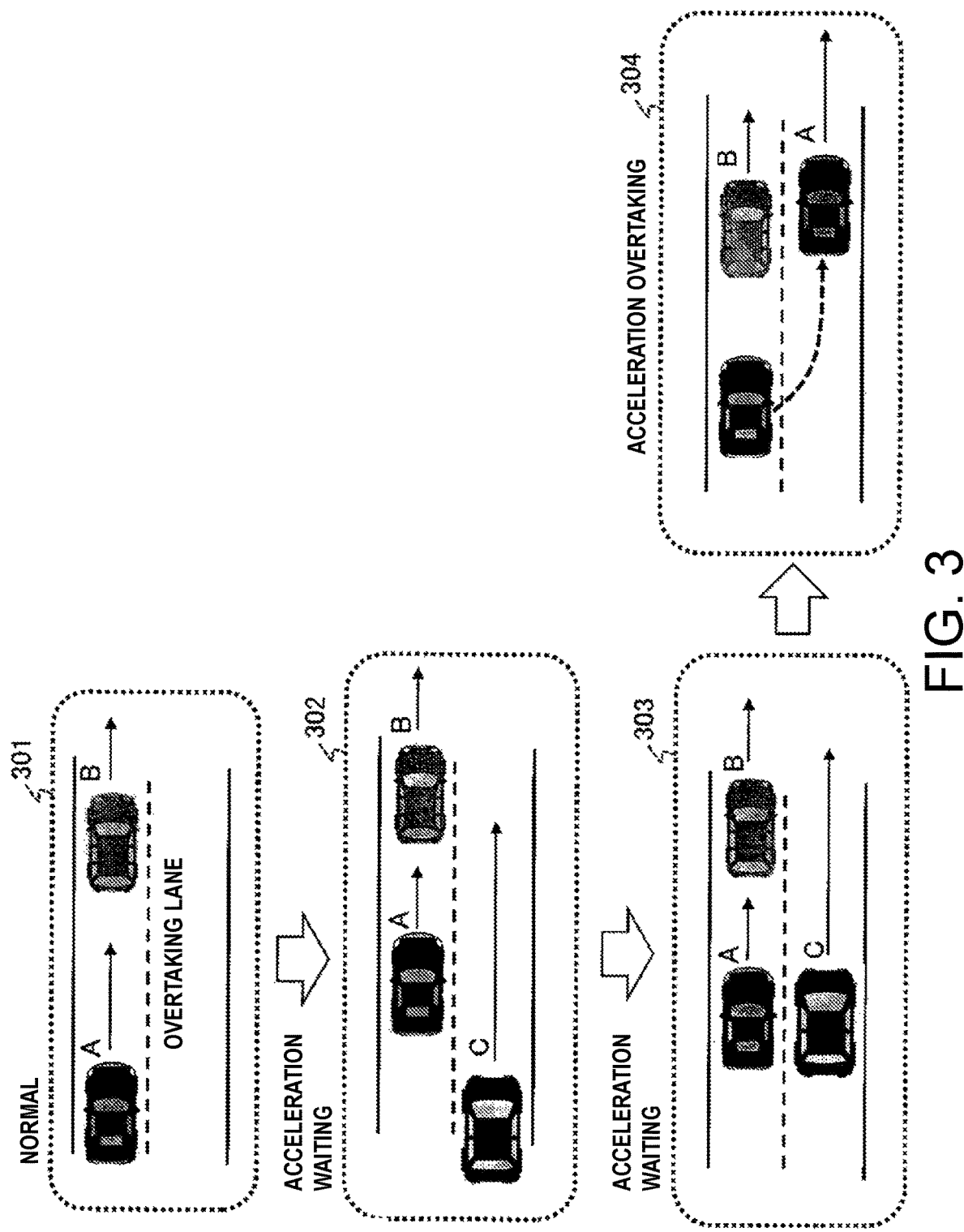
FIG. 3 is a schematic view illustrating a procedure of overtaking travel in order to describe a control method according to the present embodiment.

In FIG. 3, a vehicle A is the above-described vehicle 1 in which the control method according to the present embodiment is installed, a vehicle B is a front vehicle to be overtaken, and a vehicle C is a rear vehicle which is approaching the vehicle A to overtake the vehicle A or a front vehicle which is traveling on an overtaking lane. Such surrounding vehicles are recognized by the external environment recognition part 114 as described above.

In normal travel 301, when the vehicle A according to the present embodiment determines to overtake the front vehicle B, it is assumed that the external environment recognition part 114 has recognized the approach of the rear vehicle C. When the vehicle control device 100 determines that the rear vehicle C is approaching to overtake a host vehicle, the vehicle control device stops acceleration for overtaking for a period of time until the overtaking of the rear vehicle C (acceleration waiting 302 and 303). In addition, when the vehicle control device 100 determines that overtaking is possible after the vehicle C has overtaken the host vehicle, the vehicle control device changes a lane to an overtaking lane and increases a required driving force for acceleration to execute overtaking (acceleration overtaking 304). Meanwhile, in a case where the front vehicle C traveling on the overtaking lane is recognized, overtaking may be executed when the front vehicle C has returned to a passing lane.

According to the present embodiment, the rotational speed NE of the engine ENG is gradually increased for a period of time in the states of the acceleration waiting 302 and 303 in FIG. 3. Thereby, in a case where acceleration overtaking is actually performed, it is possible to obtain power required for acceleration only by increasing the engine speed NE to an engine speed required for a required driving force. In this manner, a sudden increase in the engine speed NE is suppressed, and a feeling of discomfort of an occupant due to sudden changes in engine sound and vibration is alleviated.

An increase rate or an increase step in the rotational speed NE during acceleration waiting (hereinafter, appropriately referred to as $\Delta NE_{UP}$) is set to such an extent that a general occupant does not feel uncomfortable. For example, an increase step $\Delta NE_{UP}$ is a value smaller than a difference between engine speeds NE respectively corresponding to the present driving force and a required driving force. Specifically, the increase step $\Delta NE_{UP}$ may be obtained by dividing a difference between engine speeds NE respectively corresponding to the present driving force and a required driving force by a desired number of 2 or greater. An occupant's feeling of discomfort is reduced as $\Delta NE_{UP}$ decreases, that is, a division number increases, while an occupant's feeling of discomfort us increased due to an increase in the amount of increase of a rotational speed NE at the time of acceleration. Thus, the magnitude of $\Delta NE_{UP}$ is determined in consideration of a balance between an occupant's feeling of discomfort at the time of acceleration waiting and a feeling of discomfort at the time of acceleration. $\Delta NE_{UP}$ may be fixed or variable. Further, in a case where a required driving force and an increase timing thereof can be predicted, $\Delta NE_{UP}$ may be calculated from the prediction values.

The control method according to the present embodiment is performed by the vehicle control device 100 mentioned above. The control function thereof can be realized by executing programs stored in a memory on the processor of the vehicle control device 100. Hereinafter, an example of the control method according to the present embodiment will be described with reference to FIG. 4.

Figure 4:
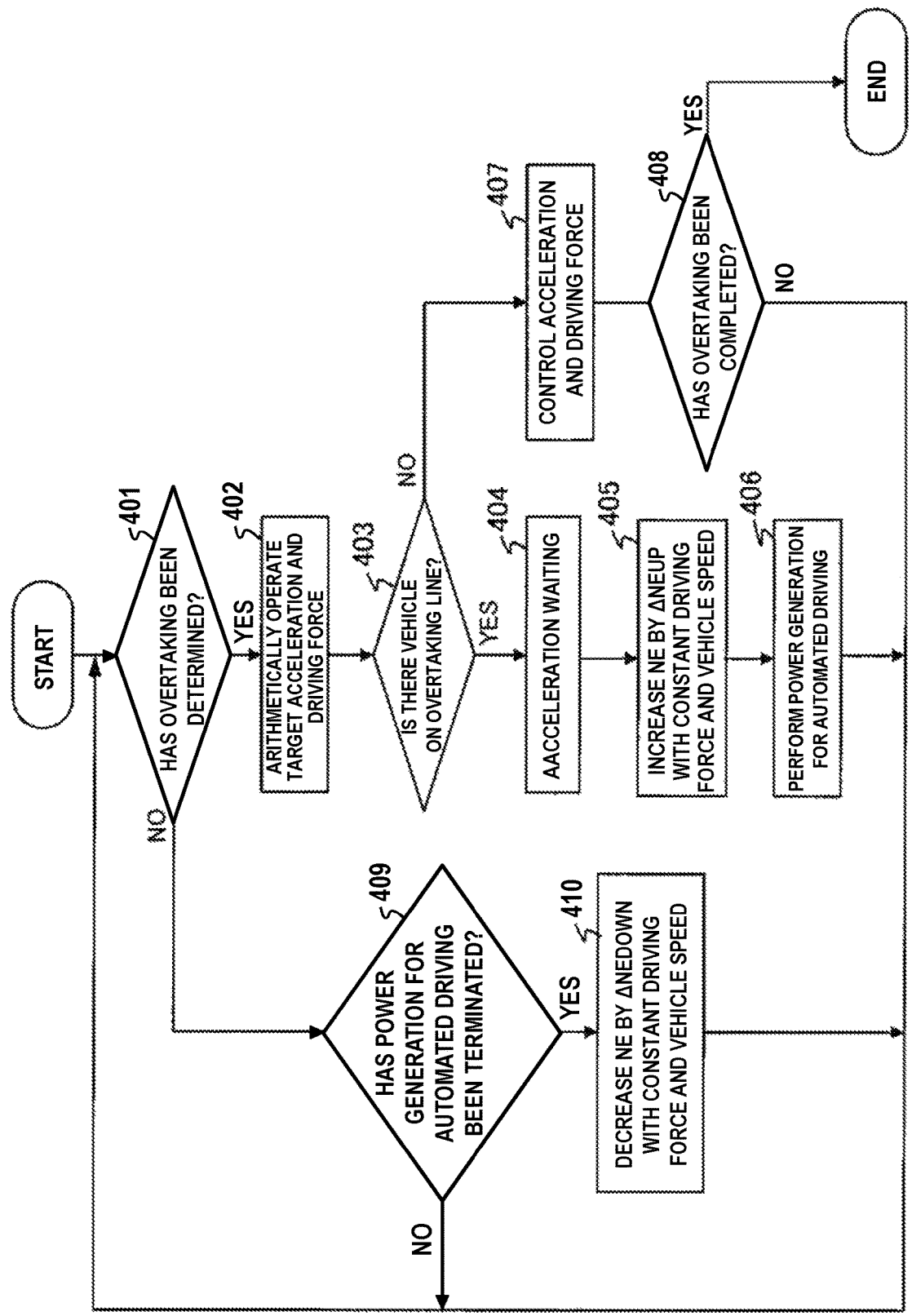
FIG. 4 is a flowchart illustrating an example of the control method according to the present embodiment.

In FIG. 4, in a case where the automated driving control part 110 determines overtaking of the front vehicle B (YES in operation 401), the automated driving control part first calculates a target acceleration and driving force (required driving force) (operation 402), and then recognizes the surrounding circumstances on the basis of information received from the outside circumstances acquisition part 12 to determine whether or not there is an approaching rear vehicle C on an overtaking lane (operation 403). When there is a rear vehicle C (YES in operation 403), the automated driving control part 110 waits for the execution of overtaking acceleration (operation 404).

In the state of acceleration waiting, the vehicle control device 100 increases the rotational speed NE of the engine ENG by $\Delta NE_{UP}$ while keeping a driving force and a vehicle speed V of the second motor generator MG2 constant (operation 405). Power generated by the motor generator MG1 connected to the engine ENG is charged in the battery BAT through the voltage control unit VCU (operation 406). The above-described operations 401 to 406 are repeated, and thus the engine speed NE increases by $\Delta NE_{UP}$ (without a feeling of discomfort) while the vehicle speed V and the driving force are kept constant during waiting for overtaking acceleration, and power generated at that time is stored in the battery BAT. Meanwhile, the vehicle speed V of the vehicle A may be reduced in an acceleration waiting period so as not to excessively approach the front vehicle B or so as to make the rear vehicle C rapidly pass.

When it is determined that overtaking is possible because a rear vehicle has disappeared (NO in operation 403), the automated driving control part 110 executes acceleration and driving force control using the target acceleration and driving force calculated in operation 402 in accordance with an action plan (operation 407). The acceleration and driving force control (operation 407) is executed until overtaking is completed (operation 408).

When it is determined that overtaking is not executed (NO in operation 401), the vehicle control device 100 determines whether or not power generation for automated driving has been terminated (operation 409). When power generation for automated driving has been terminated (YES in operation 409), the vehicle control device 100 determines that acceleration has been stopped, and reduces the rotational speed NE of the engine ENG by $\Delta NE_{DOWN}$ while keeping the driving force and the vehicle speed V of the second motor generator MG2 constant (operation 410). Thus, when acceleration is stopped, the vehicle speed V is kept constant, but the engine speed NE is reduced by $\Delta NE_{DOWN}$ (without a feeling of discomfort) (NO in operation 401, YES in operation 409, operation 410). Meanwhile, it is preferable that a width $\Delta NE_{DOWN}$ at the time of reducing the engine speed NE be smaller than the width $\Delta NE_{UP}$ at the time of increasing the engine speed. This is because the engine speed NE may be reduced slowly because acceleration has been stopped, but it is also because an occupant does not notice that the engine speed is reduced more slowly than when the engine speed is increased. Further, in a case where power generation for automated driving has not terminated (NO in operation 409), operations 401 and 409 are repeated until the next overtaking is determined (NO in operation 401, NO in operation 409).

Although control at the time of overtaking has been described as an example, the disclosure can be applied to a situation in which a sudden increase in a driving force is predicted and there is time by then. Hereinafter, assuming a general case, a change in the state of the vehicle 1 at the time of executing acceleration after acceleration waiting will be described with reference to FIG. 5.

3.2) Execution of Acceleration Waiting and Acceleration

Figure 5:
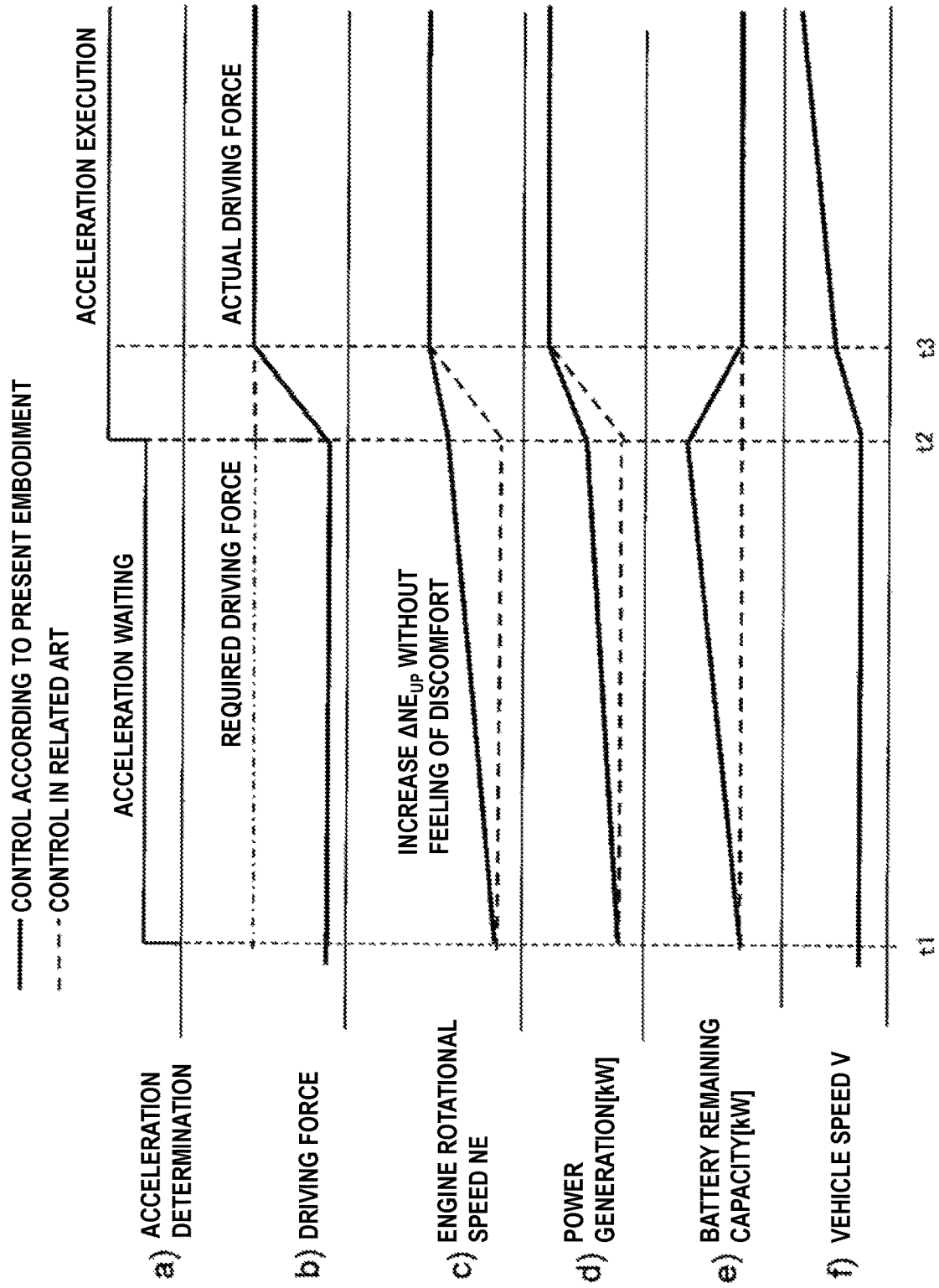
FIG. 5 is a waveform diagram illustrating a control state at the time of acceleration waiting and acceleration execution of a hybrid vehicle on the basis of the control method according to the present embodiment.

As illustrated in FIG. 5, when it is assumed that determination of acceleration waiting has been performed at a point in time t1, the vehicle control device 100 previously calculates a necessary required driving force and gradually increases an engine speed NE with a width $\Delta NE_{UP}$ (c). Accordingly, power generated by the first motor generator MG1 is increased (d), and thus a battery remaining capacity SOC of the battery BAT is increased (e). In the meantime, a driving force and a vehicle speed V are controlled so as not to change.

It is assumed that the actual driving force of the second motor generator MG2 rises for acceleration at a point in time t2 and reaches a required driving force at a point in time t3 (b). As illustrated in (c) of FIG. 5, the engine speed NE has already increased during acceleration waiting between the point in time t1 and the point in time t2. Thus, when the actual driving force rises at the point in time t2, the engine speed does not need to greatly increase to an engine speed required for a required driving force. That is, the engine speed NE between the point in time t2 and the point in time t3 does not increase sharply as illustrated in (c) of FIG. 5, and an occupant's feeling of discomfort due to sudden changes in an engine sound and vibration is alleviated.

In the related art, the engine speed NE increases suddenly between the point in time t2 and the point in time t3 (a dashed line in (c) of FIG. 5), and thus an engine sound and vibration change suddenly, which results in a great feeling of discomfort of an occupant. Such a feeling of discomfort is greatly reduced according to the present embodiment.

3.3) Stopping of Acceleration

Figure 6:
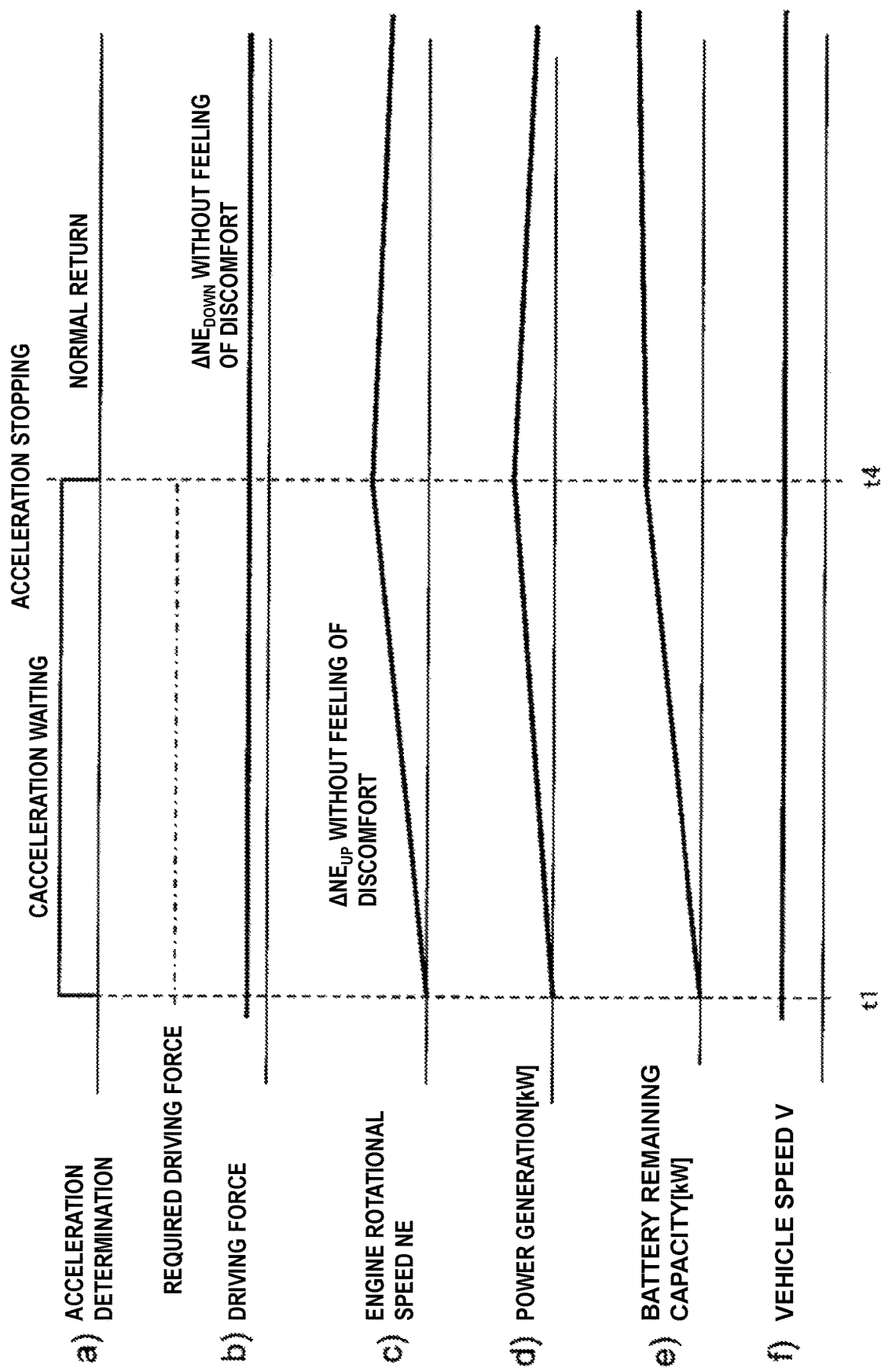
FIG. 6 is a waveform diagram illustrating a control state at the time of acceleration waiting and acceleration stop of a hybrid vehicle on the basis of the control method according to the present embodiment.

As illustrated in FIG. 6, acceleration waiting has been determined at a point in time t1, but it is assumed that the stopping of acceleration has been determined at a point in time t4. In this case, an engine speed NE has been increased until the point in time t4, and thus the vehicle control device 100 gradually reduces a rotational speed NE. According to the present embodiment, the engine speed NE is reduced by $\Delta NE_{DOWN}$ smaller than $\Delta NE_{UP}$ at the time of increasing the engine speed, as described. Power generated by the motor generator MG1 is also reduced in association with a reduction in the engine speed NE (d), and thus an increase in a battery remaining capacity SOC of the battery BAT is slowed down (e).

4. Effects

As described above, according to the embodiment of the disclosure, in a case where there is time until a change timing at which a required driving force is required during automated driving of a hybrid vehicle, an engine speed is gradually increased until the change timing, and thus it is possible to alleviate a sudden increase in the engine speed at the time of actually increasing a driving force and to suppress great changes in an engine sound and vibration.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hybrid vehicle capable of performing automated driving control for automatically controlling at least acceleration and deceleration of the hybrid vehicle, the hybrid vehicle comprising:
   an engine;
   a generator which generates power by rotation of the engine;
   a motor which outputs a travel driving force by at least one of power generated by the generator and power stored in a battery; and
   a control device which executes control of the engine and the motor together with the automated driving control,
   wherein the control device increases a rotational speed of the engine by a predetermined increase step while maintaining a speed of the hybrid vehicle to be constant or decelerating the hybrid vehicle until an increase timing of a required driving force when it is predicted that the required driving force is required to be increased while the automated driving control is performed, and supplies at least the power generated by the generator to the motor at the increase timing of the required driving force;
   wherein the control device decreases the rotational speed of the engine which has increased by a predetermined reduction step when the increase in the required driving force is stopped;
   wherein the predetermined reduction step is smaller than the predetermined increase step.

2. The hybrid vehicle according to claim 1, wherein the predetermined increase step is a value smaller than a difference between a first engine speed and a second engine speed at a highest driving force level when the required driving force is increased.

3. The hybrid vehicle according to claim 1, wherein if the required driving force is required to be increased at a time of an overtaking and there is a possibility that the hybrid vehicle collides with a front or rear vehicle on an overtaking lane when the overtaking is executed, the control device waits for the overtaking until the overtaking becomes possible.

4. A control method of executing control of an engine and a motor together with automated driving control in a hybrid vehicle which is capable of performing automated driving control for automatically controlling at least acceleration and deceleration of the hybrid vehicle and includes an engine, a generator which generates power by rotation of the engine, a motor which outputs a travel driving force by at least one of power generated by the generator and power stored in a battery, and a control device which executes control of the engine and the motor together with the automated driving control, the control method comprising:
   increasing a rotational speed of the engine by a predetermined increase step while maintaining a speed of the hybrid vehicle to be constant or decelerating the hybrid vehicle until an increase timing of a required driving force when it is predicted that the required driving force is required to be increased while the automated driving control is performed; and
   supplying at least the power generated by the generator to the motor at the increase timing of the required driving force;

wherein the rotational speed of the engine which has increased is decreased by a predetermined reduction step when the increase in the required driving force is stopped;

wherein the predetermined reduction step is smaller than the predetermined increase step.

5. The control method for the hybrid vehicle according to claim 4, wherein the predetermined increase step is a value smaller than a difference between a first engine speed and a second engine speed at a highest driving force level when the required driving force is increased.

6. The control method for the hybrid vehicle according to claim 4, wherein if the required driving force is required to be increased at a time of an overtaking and there is a possibility that the hybrid vehicle collides with a front or rear vehicle on an overtaking lane when the overtaking is executed, the control method waits for the overtaking until the overtaking becomes possible.

7. A non-transitory storage medium storing a program for a processor in a hybrid vehicle which is capable of performing automated driving control for automatically controlling at least acceleration and deceleration of the hybrid vehicle and includes an engine, a generator which generates power by rotation of the engine, a motor which outputs a travel driving force by at least one of power generated by the generator and power stored in a battery, and a processor which executes control of the engine and the motor together with the automated driving control, the program causing the processor to realize functions comprising:

a function of increasing a rotational speed of the engine by a predetermined increase step while maintaining a speed of the hybrid vehicle to be constant or decelerating the hybrid vehicle until an increase timing of a required driving force when it is predicted that the required driving force is required to be increased while the automated driving control is performed; and a function of supplying at least the power generated by the generator to the motor at the increase timing of the required driving force;

wherein the rotational speed of the engine which has increased is decreased by a predetermined reduction step when the increase in the required driving force is stopped;

wherein the predetermined reduction step is smaller than the predetermined increase step.

\* \* \* \* \*